US010019864B2

(12) United States Patent
Tomkins et al.

(10) Patent No.: US 10,019,864 B2
(45) Date of Patent: Jul. 10, 2018

(54) MERCHANDISE DISPENSING SYSTEM

(71) Applicant: PepsiCo, Inc., Purchase, NY (US)

(72) Inventors: Brian Tomkins, Purchase, NY (US); John Fontana, Purchase, NY (US); Trisha Patel, Purchase, NY (US); Adrian Caroen, London (GB)

(73) Assignee: PepsiCo, Inc., Purchase, NY (US)

( * ) Notice: Subject to any disclaimer, the term of this patent is extended or adjusted under 35 U.S.C. 154(b) by 0 days.

(21) Appl. No.: 14/369,547

(22) PCT Filed: Jan. 29, 2013

(86) PCT No.: PCT/US2013/023608

§ 371 (c)(1),
(2) Date: Jun. 27, 2014

(87) PCT Pub. No.: WO2013/116203

PCT Pub. Date: Aug. 8, 2013

(65) Prior Publication Data

US 2014/0365001 A1 Dec. 11, 2014

Related U.S. Application Data

(60) Provisional application No. 61/592,065, filed on Jan. 30, 2012.

(51) Int. Cl.
*G07F 11/00* (2006.01)
*G07F 17/00* (2006.01)
(Continued)

(52) U.S. Cl.
CPC ............ *G07F 11/002* (2013.01); *G07F 9/023* (2013.01); *G07F 13/065* (2013.01); *G07F 13/10* (2013.01); *G07F 17/0064* (2013.01)

(58) Field of Classification Search
CPC .. G07F 13/10; G07F 17/0064; G07F 17/0071; G07F 17/0078; G07F 17/0085; G07F 11/002; G07F 9/023; G07F 13/065
(Continued)

(56) References Cited

U.S. PATENT DOCUMENTS 3,587,918 A * 6/1971 Cornelius ............... G07F 13/10 221/96
3,859,904 A * 1/1975 Carriazo ................ A47J 37/00 221/251

(Continued)

FOREIGN PATENT DOCUMENTS

EP 0375884 A1 7/1990
WO 2006017907 A2 2/2006

OTHER PUBLICATIONS

International Search Report and Written Opinion dated May 23, 2013 for PCT/US2013/023608.

*Primary Examiner* — Michael Collins
(74) *Attorney, Agent, or Firm* — Brandon V. Zuniga; James R. Gourley; Carstens & Cahoon, LLP

(57) ABSTRACT

A merchandise dispensing system for storing and dispensing food products, consumables, and beverages may include a plurality of modules, such as a food module, a consumables module, a beverage module, and one or more container modules. The modules may be positioned adjacent each other or connected to each other to form a merchandise dispensing system.

35 Claims, 12 Drawing Sheets

(51) Int. Cl.
*G07F 9/02* (2006.01)
*G07F 13/06* (2006.01)
*G07F 13/10* (2006.01)

(58) Field of Classification Search
USPC .................................................. 700/231–244
See application file for complete search history.

(56) References Cited

U.S. PATENT DOCUMENTS 3,928,045 A * 12/1975 Tsunoda .................. A47J 27/18 221/150 HC
4,134,624 A 1/1979 Moyer
4,331,068 A * 5/1982 Asami ..................... A47J 27/14 222/129.4
4,645,093 A * 2/1987 Jones ....................... A23G 9/28 141/104
5,027,698 A * 7/1991 Chirnomas ............. A23G 9/28 141/104
5,450,938 A * 9/1995 Rademacher ...... G06Q 20/3437 194/206
5,555,793 A * 9/1996 Tocchet .............. G07F 17/0078 221/150 A
5,884,807 A * 3/1999 Yun ................................ 221/96
6,059,142 A * 5/2000 Wittern, Jr. ............... G07F 5/18 221/1
6,464,104 B1 * 10/2002 Waddell .................... G07F 9/02 221/150 A
7,299,109 B2 * 11/2007 Juds ........................ G07F 11/00 700/232
8,126,589 B1 * 2/2012 Parker ................... G07F 13/065 221/96
2004/0249502 A1 * 12/2004 Truong et al. ................ 700/232
2007/0170179 A1 * 7/2007 Segiet et al. .................. 219/679
2009/0177318 A1 * 7/2009 Sizemore ................ G07F 9/026 700/236
2013/0096715 A1 * 4/2013 Chung ................... G06Q 20/32 700/233
2014/0365001 A1 * 12/2014 Tomkins et al. .............. 700/238

* cited by examiner

MERCHANDISE DISPENSING SYSTEM

CROSS-REFERENCE TO RELATED APPLICATION

This application claims priority to and the benefit of U.S. Provisional Application No. 61/572,065, filed Jan. 30, 2012, which application is incorporated by reference herein in its entirety and made part hereof.

FIELD

The invention relates generally to a merchandise dispensing system for dispensing food and beverages.

BACKGROUND

Food and beverage dispensers are commonly used in many types of businesses, including hotels that provide food and beverages for their guests. Food and beverage dispensers generally dispense either food or beverages. To obtain both food and beverages, a consumer may have to visit multiple dispensers. An aspect of this invention is to provide a more efficient merchandise dispensing system that dispenses both food and beverages.

BRIEF SUMMARY

The present invention provides a merchandise dispensing system for storing and dispensing food products, consumables, and beverages. The merchandise dispensing system may include a plurality of modules, such as a food module, a consumables module, a beverage module, and one or more container modules. The modules may be positioned adjacent each other or connected to each other to form a merchandise dispensing system.

The food module may contain a plurality of components, such as a food dispensing unit, a plurality of frames, a plurality of panels, and a food storage unit. The food module may dispense any type of food. In at least one embodiment, the food module dispenses breakfast food, such as oatmeal.

The consumables module may contain a plurality of components, such as a consumables unit, one or more panels, storage compartments, and a frame. The consumables modules may stock any type of consumable item, such as silverware or food products, such as toppings.

The beverage module may contain a plurality of components, such as a beverage dispensing unit, a plurality of frames, a plurality of panels, and a beverage storage unit. The beverage module may dispense any type of beverages, including carbonated beverages and juices.

The container modules may include one or more container units configured to store containers or covers for the containers. For example, the container units may be configured to store cups, bowls, and lids.

The merchandise dispensing system may include a messaging system that provides messages to a user of the system. The messages displayed may be based on many different factors, such as the time of day, the product being served, the proximity of a user to the system, etc.

The merchandise dispensing system may include social media capabilities. The merchandise dispensing system may include a social media computer or server, and an interface. The social media computer may be configured to be operatively connected to the interface and receive from the interface instructions for a beverage or food purchase order, a beverage or food gift, a beverage or food redemption, or a beverage or food promotion, and generating a code based on the received instructions. The interface may also be configured to recognize a gesture of a user relating to a beverage order of a customer.

Figure 1:
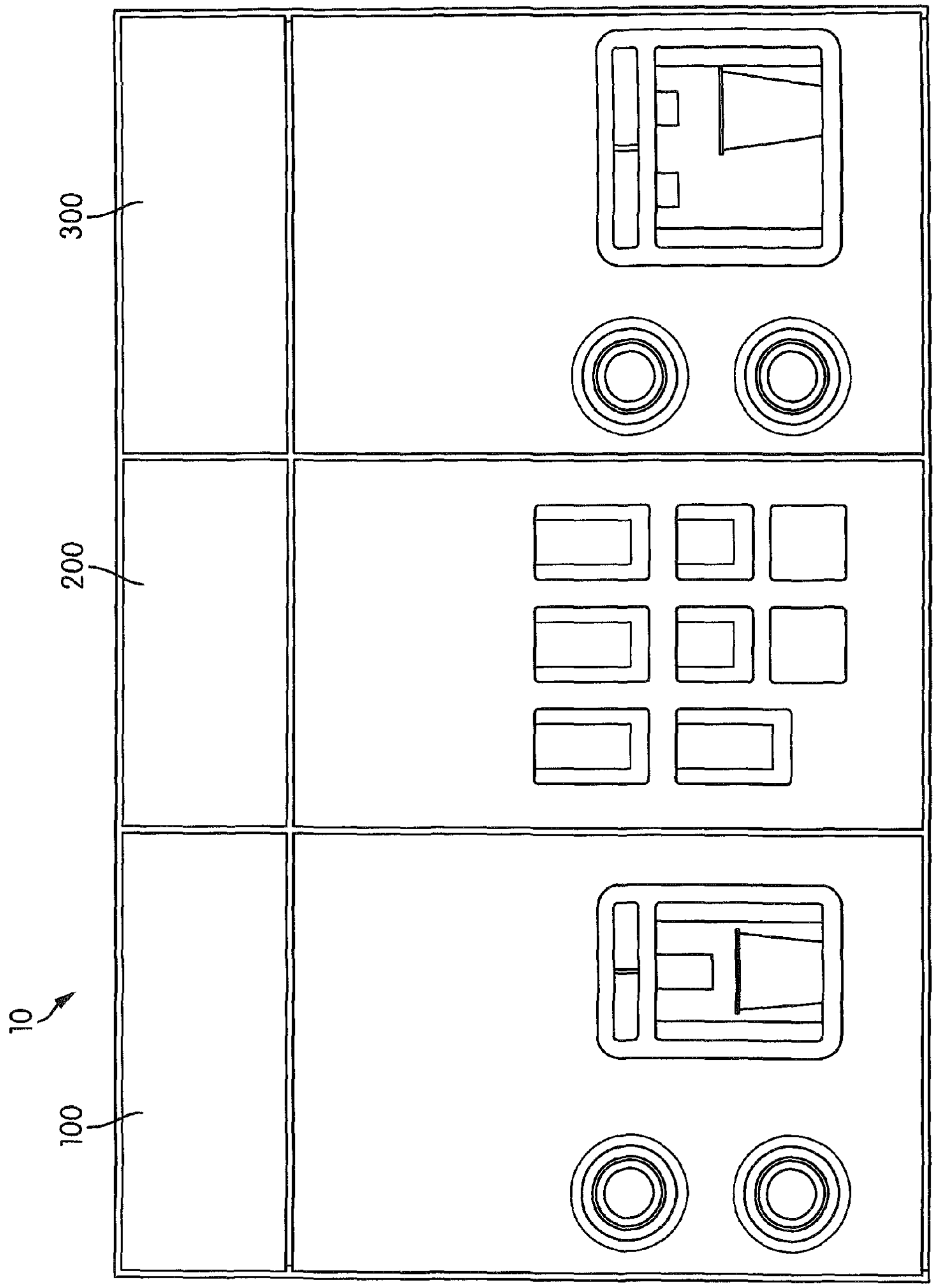
FIG. 1 illustrates a front view of a merchandise dispensing system in accordance with aspects of the invention.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE EMBODIMENTS

A merchandise dispensing system 10 is generally illustrated in FIG. 1. In at least one embodiment, the merchandise dispensing system 10 is configured to dispense food and beverages. The merchandise dispensing system may include a plurality of modules, such as a food module 100, a consumables module, 200, a beverage module 300, and one or more container modules 400. Any number of modules may be included within the scope of the invention. The modules may be connected to each other or may be separate components that sit adjacent each other, or are in close proximity to each other to form the merchandise dispensing system 10. Alternatively, the modules may be of unitary construction. Any suitable attachment means may be used to connect one or more modules together. For example, the modules may be connected together through the use of mechanical fasteners, such as screws or nuts and bolts.

The merchandise dispensing system 10 may be configured to sit on a table or a counter top. Alternatively, the merchandise display system 10 may be a stand-alone device or may be portable or mobile. The merchandise dispensing system 10 may be located in either a manned or an unmanned environment. The merchandise dispensing system 10 may be configured to store and dispense both hot and cold food and beverages and both wet and dry food. The merchandise dispensing system 10 may be configured to store and dispense both carbonated and non-carbonated beverages. Any type of beverage or food may be dispensed from the merchandise dispensing system 10 at any time throughout a day.

Figure 2:
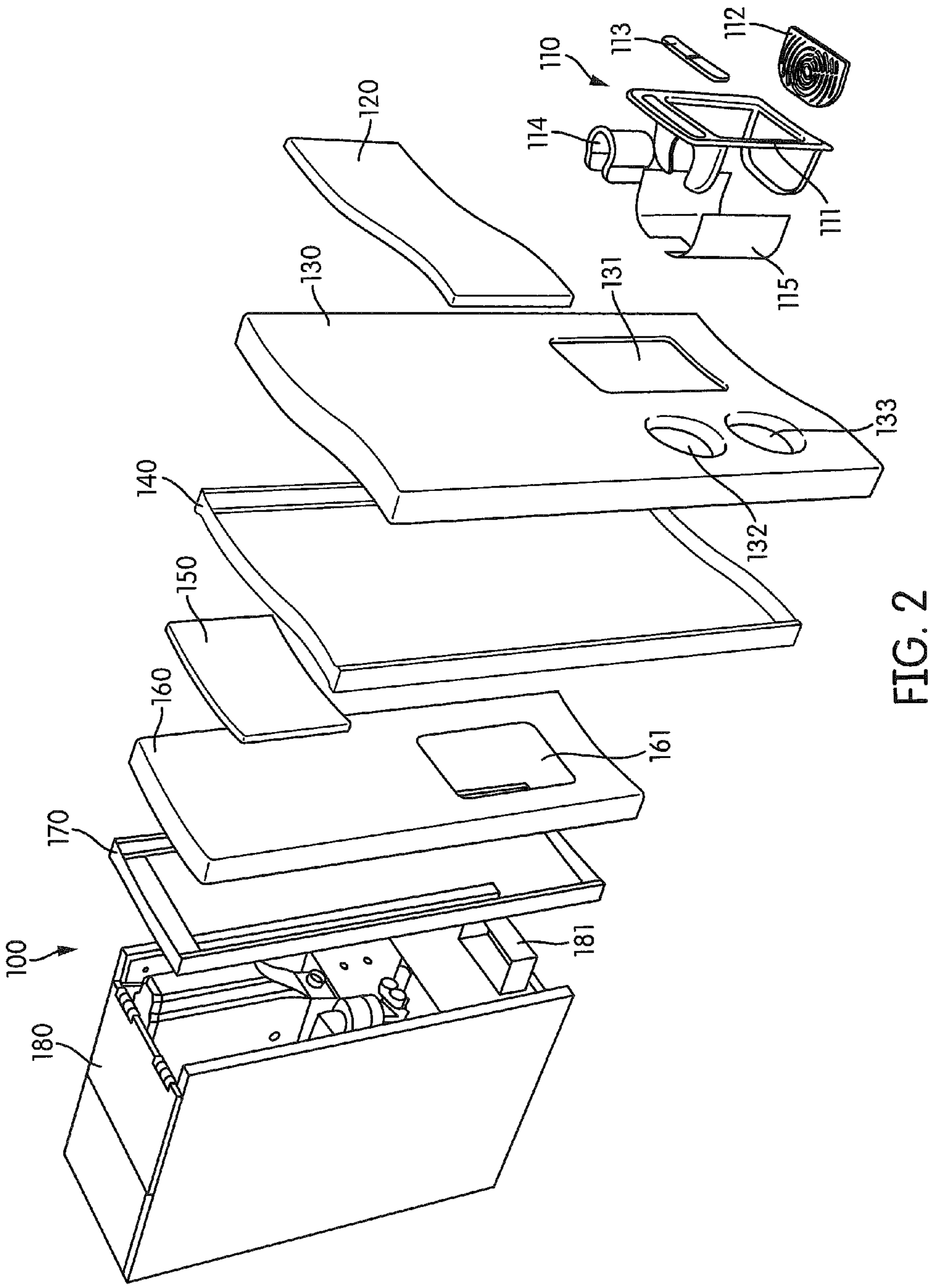
FIG. 2 illustrates an exploded view of a food module in accordance with aspects of the invention.
Figure 3A:
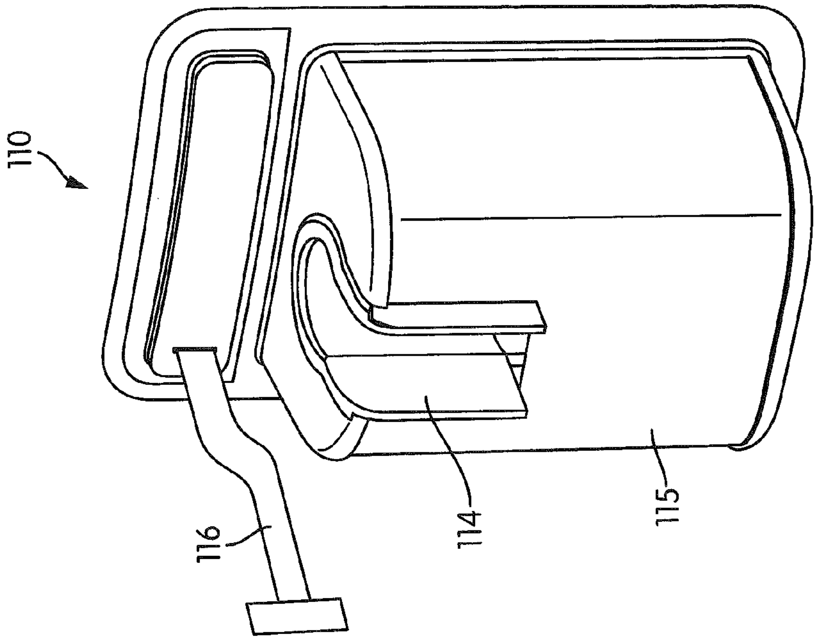
FIGS. 3A and 3B illustrate back and front perspective views, respectively, of a food dispensing unit in accordance with aspects of the invention.
Figure 3B:
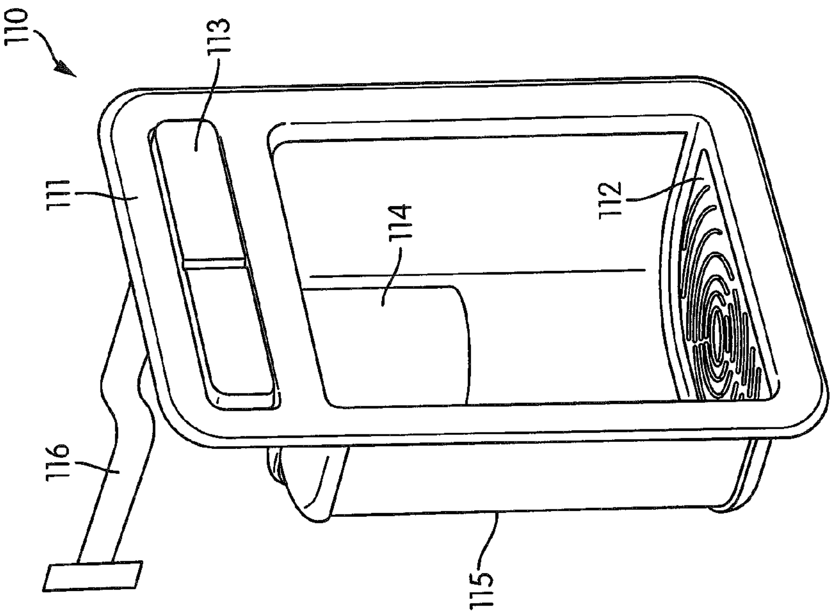
Figure 3C:
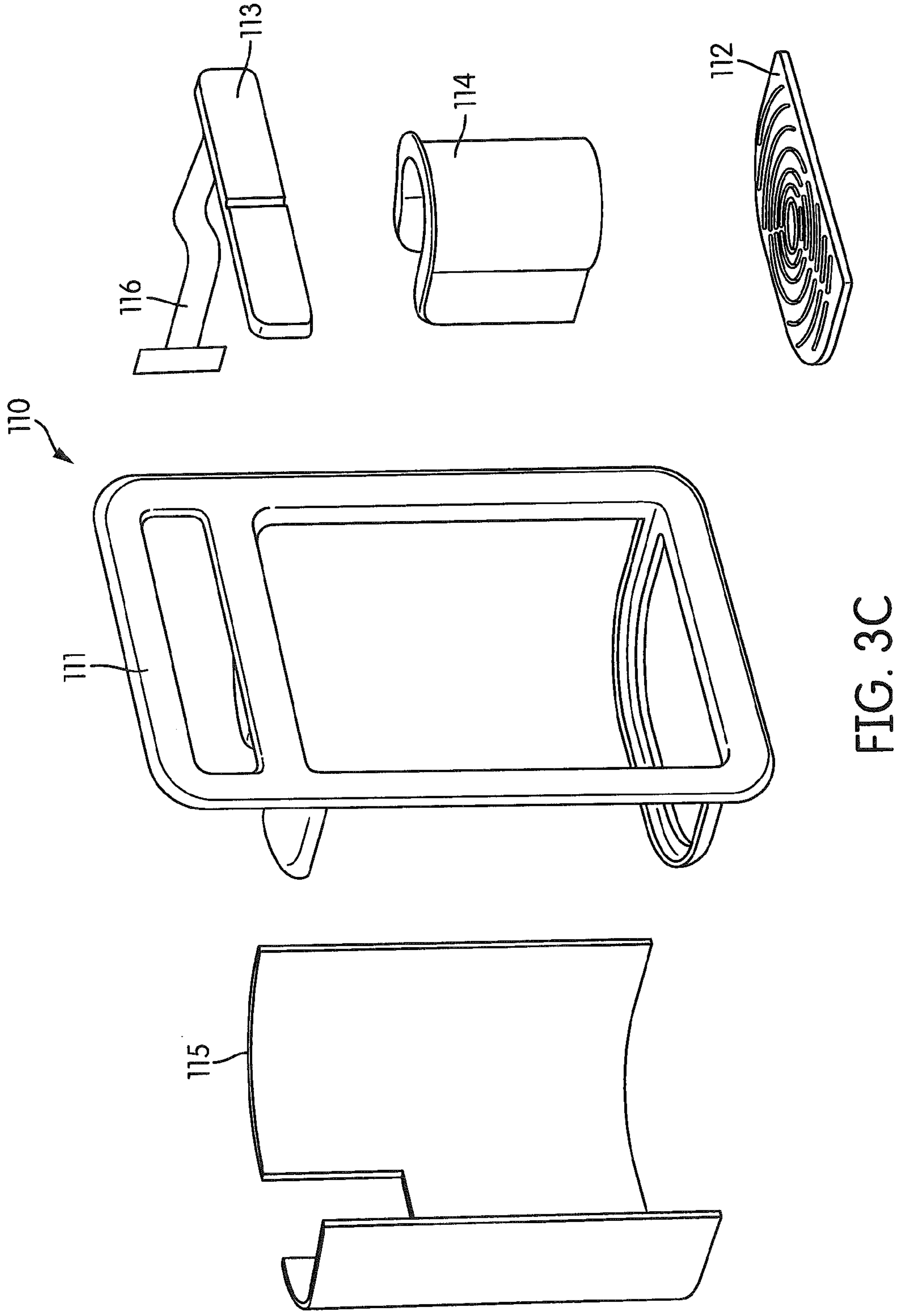
FIG. 3C illustrates an exploded view of a food dispensing unit in accordance with aspects of the invention.

FIG. 2 illustrates an exploded view of an exemplary embodiment of a food module 100. The food module 100 may be any shape or size and may be configured to dispense any type of food. In at least one embodiment, the food module 100 may be configured to dispense breakfast food, such as oatmeal. The food module 100 may include a plurality of components. For example, the food module 100 may include a food dispensing unit 110, a plurality of frames 140, 170, a plurality of panels 120, 130, 150, 160, and a food storage unit 180.

In at least one embodiment, the food module 100 includes an inner frame 170 that attaches to an inner panel 160. The inner frame 170 and inner panel 160 may attach to each other in any suitable manner. For example, the inner panel 160 and inner frame 170 may snap together or may be mechanically fastened together. The inner frame 170 and inner panel 160 may be configured to attach to the front of the food storage unit 180. The inner frame 170 and inner panel 160 may attach to the food storage unit 180 in any suitable manner. For example, the inner frame 170 and inner panel 160 may be mechanically fastened to the food storage unit 180. In at least one embodiment, the inner frame 170 and inner panel 160 are lockingly engaged to the food storage unit 180. The inner panel 160 may contain one or more apertures 161.

The food storage unit 180 may be any size or shape and may contain any necessary components to store and dispense hot and/or cold food products. For example, the food storage unit 180 may contain heating units, cooling units, dispensing tubes, and/or storage units. The food storage unit 180 may also store and dispense wet and/or dry food products. In at least one embodiment, the food storage unit 180 includes a liquid source for reconstituting a dried food product. For example, the food storage unit 180 may be configured to dispense a dry food product such as oatmeal or dried mashed potatoes and also be configured to dispense hot water into the dry food product in order to reconstitute the food product. The fluid may be added to the dry food product before, during or after dispensing the food product. The food storage unit 180 may include a catch tray 181 to catch excess food product.

In at least one embodiment, the food module 100 includes an outer frame 140 and an outer panel 130. The outer frame 140 and outer panel 130 may attach to each other in any suitable manner. For example, the outer panel 130 and outer frame 140 may snap together or may be mechanically fastened together. The outer frame 140 and outer panel 130 may be configured to attach to the inner frame 170 and/or inner panel 160. The outer frame 140 and outer panel 130 may attach to one or both of the inner frame 170 and inner panel 160 in any suitable manner, for example, via mechanical fasteners.

The inner frame 170 and outer frame 140 may be made of any suitable material, such as metal or plastic. In at least one embodiment, the inner frame 170 and outer frame 140 are made of steel. The inner panel 160 and outer panel 130 may be made of any suitable material, such as metal or plastic. In at least one embodiment, the inner panel 160 and outer panel 130 are made of plastic. The inner panel 160 and the outer panel 130 may include graphics on the outer surfaces of the panel. For example, the graphics may be logos, pictures, or descriptions of the food being dispensed from the food module 100.

In at least one embodiment, the outer panel 130 includes a plurality of apertures 131, 132, 133. In at least one embodiment, the aperture 131 on the outer panel 130 corresponds to the aperture 161 on the inner panel 160. The apertures 131 and 161 may be configured to receive a food dispensing unit 110. The apertures 131 and 161 may further be configured to receive the catch tray 181.

In at least one embodiment, the food module 100 includes one or more panels 120, 150 for displaying information. The panels 120, 150 may be made out of any suitable material and may be attached to the inner panel 160 and/or outer panel 130 in any suitable manner. In at least one embodiment, one or more of the panels 120, 150 include an electronic display. In at least one embodiment, the display is customizable. For example, the display may change based on a time of day or based on the product dispensed from the food module 100. In at least one embodiment, the display may be an interactive display that a user of the merchandise dispensing system 10 may interact with.

The food dispensing unit 110, as illustrated in FIGS. 2, 3A, 3B, and 3C, may include a plurality of components, such as a bezel 111, a bottom surface 112, a button assembly 113, a wiring assembly 116, one or more nozzle covers 114, and a rear surface 115. The components may be attached to each other in any suitable manner. Alternatively, two or more components may be of unitary construction. The components may be made of any suitable material, such as metal or plastic. In at least one embodiment, one or more of the components of the food dispensing unit 110 has a metallic finish. The food dispensing unit 110 may attach to one or more of the outer panel 130, inner panel 160 and/or food storage unit 180 in any suitable manner, for example, via mechanical fasteners or adhesives.

The bottom surface 112 of the food dispensing unit 110 may be attached to the bezel 111 and may have a surface defining a plurality of apertures, which allow food product to pass through the apertures. Alternatively, the bottom surface 112 may be a solid surface. The button assembly 113 may include one or more buttons. In at least one embodiment, the button assembly 113 includes a plurality of buttons. The wiring assembly 116 may be attached to the button assembly 113 and configured to attach the button assembly 113 to components within the food storage unit 180, to allow the food module 100 to dispense food product when the one or more buttons on the button assembly 113 are pressed. The rear surface 115 of the food dispensing unit 110 may be any suitable shape that allows food product to be dispensed and collected within a container placed in the food dispensing unit 110. In at least one embodiment, the rear surface 115 is concave shaped to allow a cup or bowl to sit on the bottom surface 112. The food dispensing unit 110 may include one or more nozzle covers 114 that cover nozzles located on the food storage unit 180, which are configured to dispense food. In at least one embodiment, the dispensing unit 110 includes a nozzle for micro-dosing an additive or flavoring into the food product. In at least one embodiment, the dispensing unit 110 includes a nozzle for injecting air into the food product.

Figure 4:
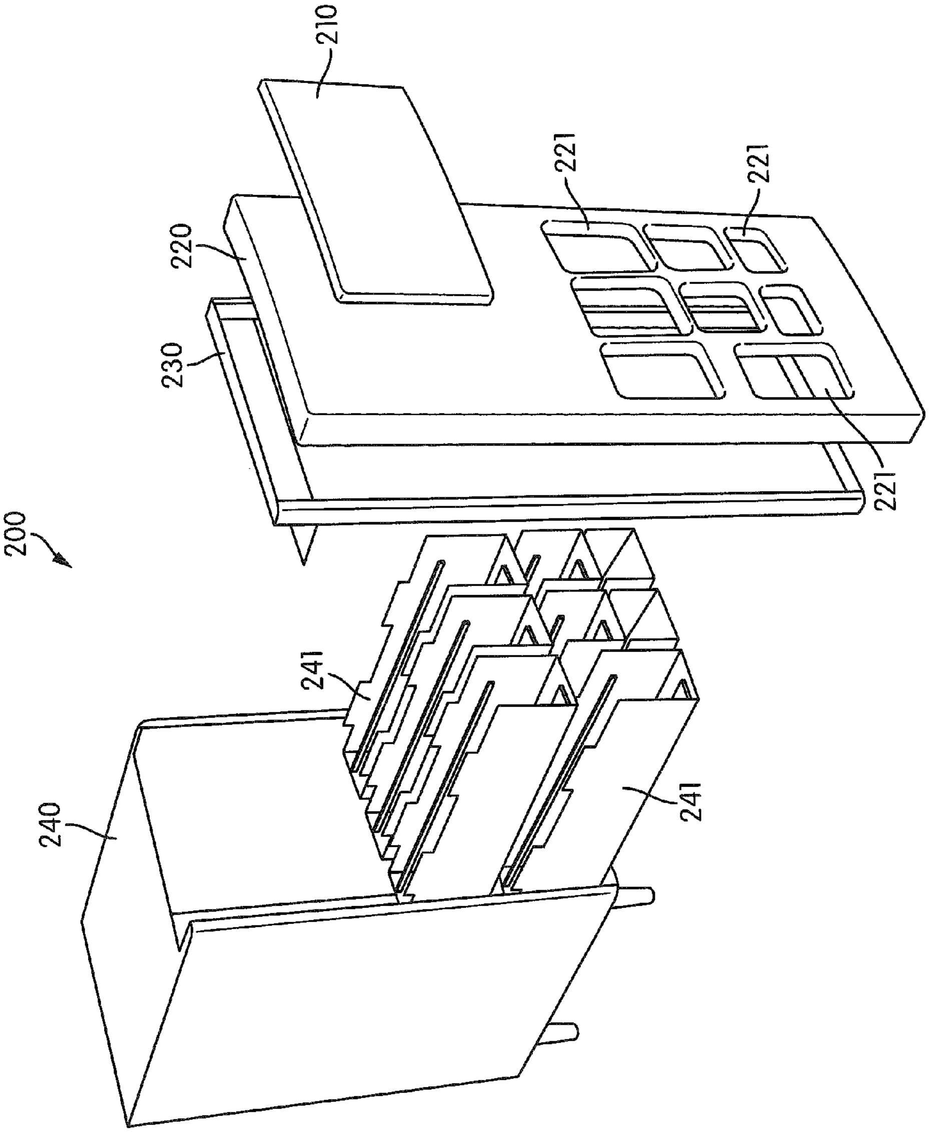
FIG. 4 illustrates an exploded view of a consumables module in accordance with aspects of this invention.

As illustrated in FIG. 4, a consumables module 200 may include a plurality of components. For example, the consumables module 200 may include one or more panels 210, 220, a frame 230, and a consumables unit 240. The consumables module 200 may be any necessary shape or size to store and dispense consumable items. The frame 230 may be made of any suitable material, such as plastic or metal. In at least one embodiment, the frame 230 is made of steel. The panels 210, 220 may be made of any suitable material, such as metal or plastic. In at least one embodiment, one or more of the panels 210, 220 are made of plastic. In at least one embodiment, one or more of the panels 210, 220 include graphics. In at least one embodiment, one or more of the panels 210, 220 include an electronic display, which may be interactive.

In at least one embodiment, the frame 230 attaches to panel 220. The panel 220 may attach to the frame 230 in any suitable manner. For example, the panel 220 and frame 230 may snap together or may be attached by mechanical fasteners. The frame 230 and panel 220 may attach to the front of the consumables unit 240 in any suitable manner. In at least one embodiment, the frame 230 and panel 220 are lockingly engaged to the consumables unit 240.

The consumables unit 240 may include one or more of storage compartments 241. The storage compartments 241 may be made of any suitable material, such as metal or plastic. In at least one embodiment, the storage compartments 241 are made of aluminum. The storage compartments 241 may be any shape or size and configured to store and dispense consumable items. For example, the storage compartments 241 may be configured to hold silverware, such as spoons, or food products, such as toppings for oatmeal. In at least one embodiment, the storage compartments 241 are slidably engaged with the consumable unit 240 to allow the consumables to be restocked. The storage compartments 241 may be restocked from either the back or the front of the consumables unit 240. The panel 220 may include a plurality of apertures 221 that correspond with the location of the storage compartments 241 to allow access to the storage compartments 241. The consumables module 200 may further include dispensing nozzles or any type of dispensing means, such as handles or knobs, to aid in dispensing consumable items.

Figure 5:
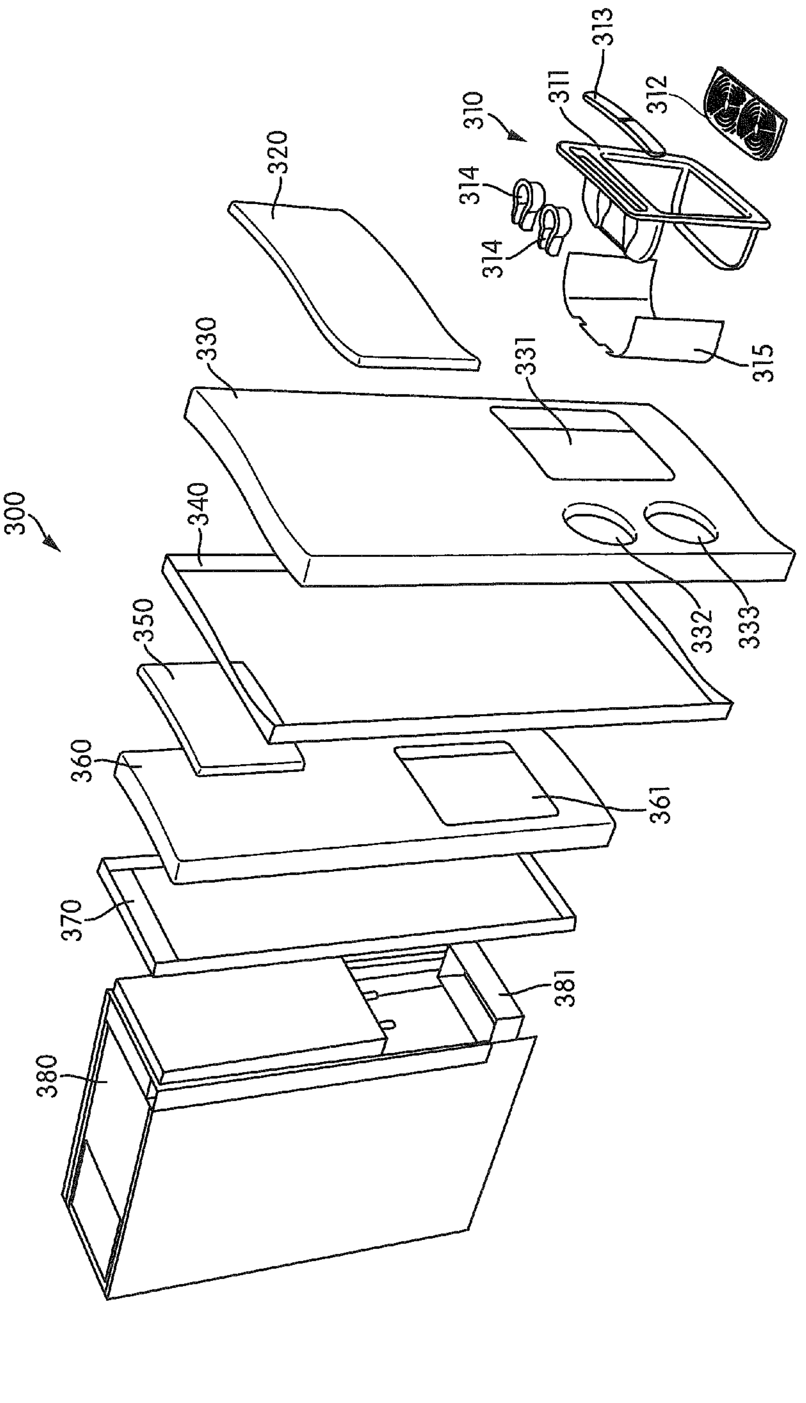
FIG. 5 illustrates an exploded view of a beverage module in accordance with aspects of this invention.
Figure 6B:
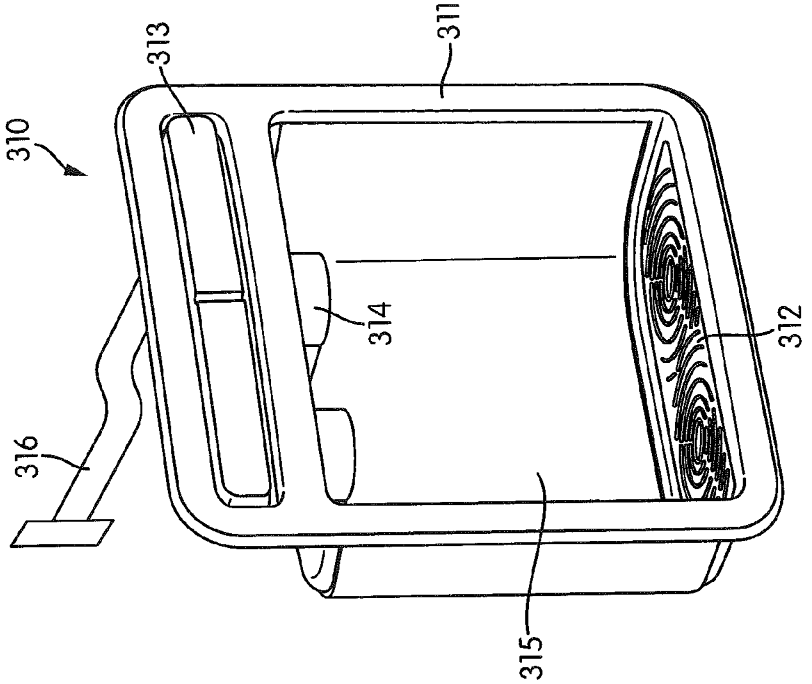
FIGS. 6A and 6B illustrate perspective views of a beverage dispensing unit in accordance with aspects of the invention.
Figure 6A:
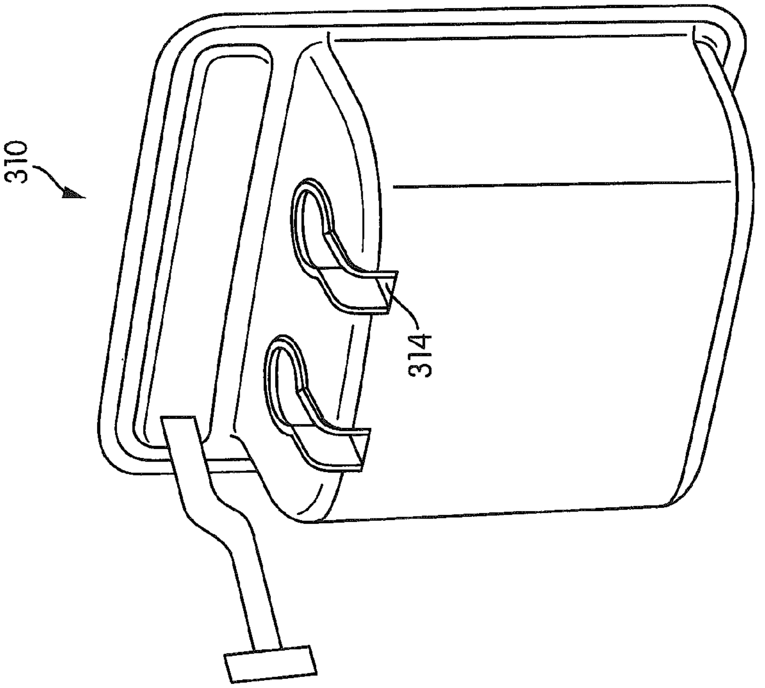
Figure 6C:
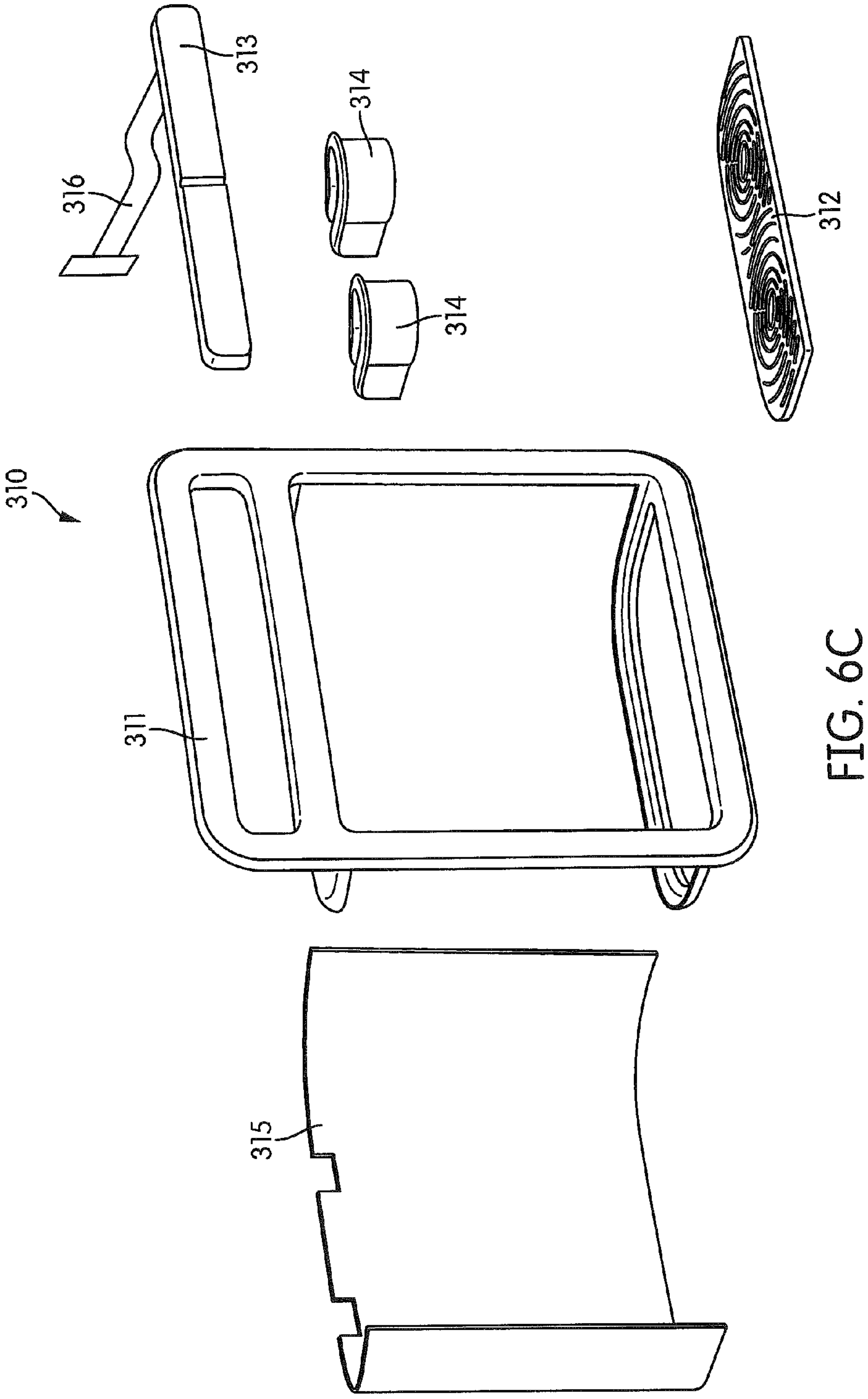
FIG. 6C illustrates an exploded view of a beverage dispensing unit in accordance with aspects of the invention.

FIG. 5 illustrates an exploded view of an exemplary embodiment of a beverage module 300. The beverage module 300 may be any shape or size and may be configured to dispense any type of hot or cold beverage. In at least one embodiment, the beverage module 300 may be configured to dispense breakfast juices, such as orange juice and grapefruit juice. Alternatively, the beverage module 300 may dispense carbonated beverages or a combination of non-carbonated and carbonated beverages. The beverage module 300 may include a plurality of components. For example, the beverage module 300 may include a beverage dispensing unit 310, a plurality of frames 340, 370, a plurality of panels 320, 330, 350, 360, and a beverage storage unit 380.

In at least one embodiment, the beverage module 300 includes an inner frame 370 that attaches to an inner panel 360. The inner frame 370 and inner panel 360 may attach to each other in any suitable manner. For example, the inner panel 360 and inner frame 370 may snap together or may be mechanically fastened together. The inner frame 370 and inner panel 360 may be configured to attach to the front of the beverage storage unit 380. The inner frame 370 and inner panel 360 may attach to the beverage storage unit 380 in any suitable manner. For example, the inner frame 370 and inner panel 360 may be mechanically fastened to the beverage storage unit 380. In at least one embodiment, the inner frame 370 and inner panel 360 are lockingly engaged to the beverage storage unit 380. The inner panel 360 may contain one or more apertures 361.

The beverage storage unit 380 may be any size or shape and may contain any necessary components to store and dispense hot and/or cold beverages, including carbonated and non-carbonated beverages. For example, the beverage storage unit 380 may contain heating units, cooling units, dispensing tubes, carbonation units, and/or storage units. The beverage storage unit 380 may include a catch tray 381 to catch excess product.

In at least one embodiment, the beverage module 300 includes an outer frame 340 and an outer panel 330. The outer frame 340 and outer panel 330 may attach to each other in any suitable manner. For example, the outer panel 330 and outer frame 340 may snap together or may be mechanically fastened together. The outer frame 340 and outer panel 330 may be configured to attach to the inner frame 370 and/or inner panel 360. The outer frame 340 and outer panel 330 may attach to one or both of the inner frame 370 and inner panel 360 in any suitable manner, for example, via mechanical fasteners.

The inner frame 370 and outer frame 340 may be made of any suitable material, such as metal or plastic. In at least one embodiment, the inner frame 370 and outer frame 340 are made of steel. The inner panel 360 and outer panel 330 may be made of any suitable material, such as metal or plastic. In at least one embodiment, the inner panel 360 and outer panel 330 are made of plastic. The inner panel 360 and the outer panel 330 may include graphics on the outer surfaces of the panel. For example, the graphics may be logos, pictures, or descriptions of the food being dispensed from the food module 100.

In at least one embodiment, the outer panel 330 includes a plurality of apertures 331, 332, 333. In at least one embodiment, the aperture 331 on the outer panel 330 corresponds to the aperture 361 on the inner panel 360. The apertures 331 and 361 may be configured to receive a beverage dispensing unit 310. The apertures 331 and 361 may further be configured to receive the drip tray 381.

In at least one embodiment, the beverage module 300 includes one or more panels 320, 350 for displaying information. The panels 320, 350 may be made out of any suitable material and may be attached to the inner panel 360 and/or outer panel 330 in any suitable manner. In at least one embodiment, one or more of the panels 320, 350 include an electronic display. In at least one embodiment, the display is customizable. For example, the display may change based on a time of day or based on the product dispensed from the beverage module 300. In at least one embodiment, the display may be an interactive display that a user of the merchandise dispensing system 10 may interact with.

The beverage dispensing unit 310, as illustrated in FIGS. 5, 6A, 6B, and 6C, may include a plurality of components, such as a bezel 311, a bottom surface 312, a button assembly 313, a wiring assembly 316, one or more nozzle covers 314, and a rear surface 315. The components may be attached to each other in any suitable manner. Alternatively, two or more components may be of unitary construction. The components may be made of any suitable material, such as metal or plastic. In at least one embodiment, one or more of the components of the beverage dispensing unit 310 has a metallic finish. The beverage dispensing unit 310 may attach to one or more of the outer panel 330, inner panel 360 and/or beverage storage unit 380 in any suitable manner, for example, via mechanical fasteners or adhesives.

The bottom surface 312 of the beverage dispensing unit 310 may be attached to the bezel 311 and may have a surface defining a plurality of apertures, which allow liquid to pass through the apertures into the drip tray 381. Alternatively, the bottom surface 312 may be a solid surface. The button assembly 313 may include one or more buttons. In at least one embodiment, the button assembly 313 includes a plurality of buttons. The wiring assembly 316 may be attached to the button assembly 313 and configured to attach the button assembly 313 to components within the beverage storage unit 380, to allow the beverage module 300 to dispense beverages when the one or more buttons on the button assembly 313 are pressed. The rear surface 315 of the beverage dispensing unit 310 may be any suitable shape that allows beverages to be dispensed and collected within a container placed in the beverage dispensing unit 310. In at least one embodiment, the rear surface 315 is concave shaped to allow a cup to sit on the bottom surface 312. The beverage dispensing unit 310 may include one or more nozzle covers 314 that cover one or more nozzles located on the beverage storage unit 380, which are configured to dispense beverages.

In at least one embodiment, the merchandise dispensing system 10 includes a dispensing means for dispensing flavor capsules or pods into a beverage. In at least one embodiment, the flavor capsules are dispensed into the beverage through a nozzle in the beverage dispensing unit 310. Alternatively, the flavor capsule may be added to the merchandise dispensing system 10 through a door or compartment and dispensed into the beverage through a nozzle in the beverage dispensing unit 310. In another embodiment, the merchandise dispensing system 10 may include a dispensing means for dispensing flavor cartridges into a beverage. The flavor cartridges may be stored within beverage dispensing unit 310 and dispensed through a nozzle in the beverage dispensing unit 310.

Figure 7B:
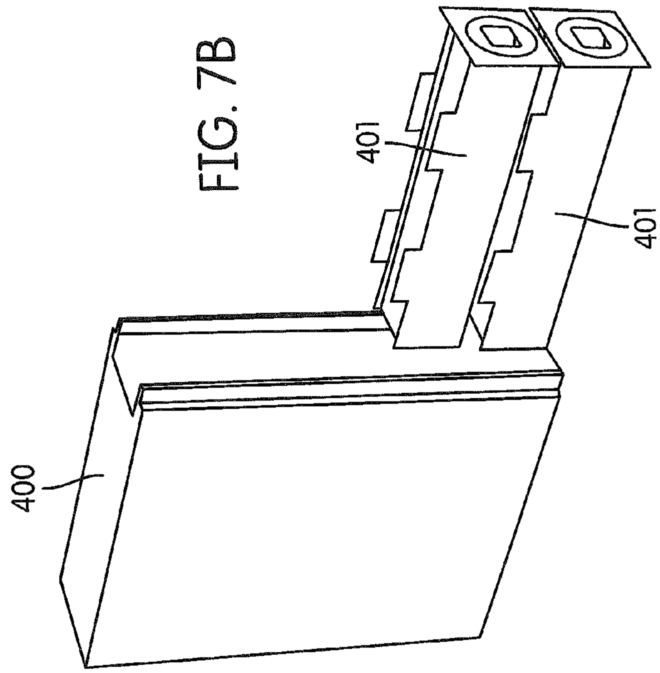
FIGS. 7A and 7B illustrate side perspective views of container modules in accordance with aspects of this invention.
Figure 7A:
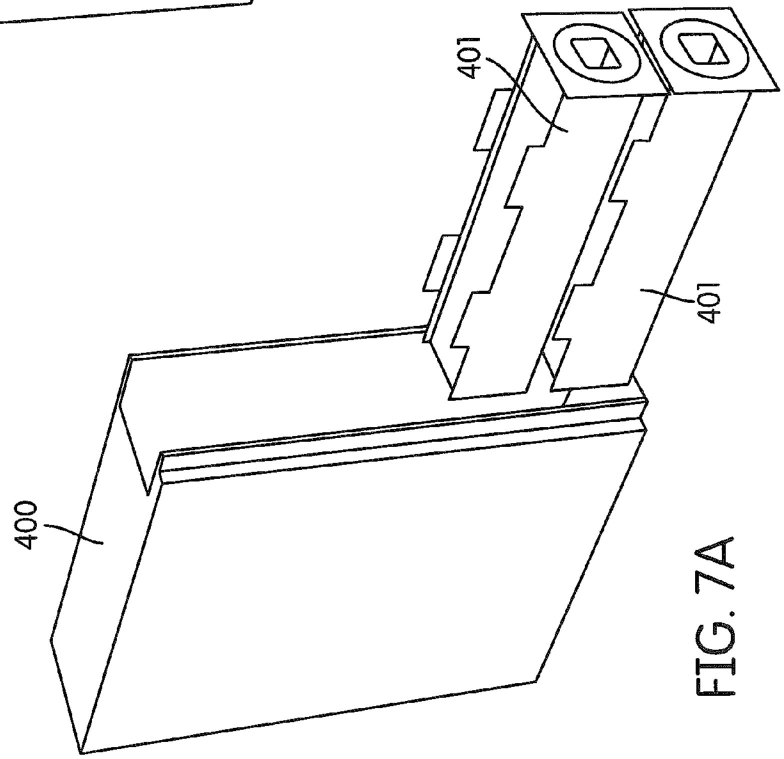

FIGS. 7A and 7B illustrate a plurality of container modules 400. The container modules 400 may be configured to hold any type of container and/or cover for a container. For example, the container modules 400 may be configured to hold bowls or cups and lids for the bowls or cups. The container modules 400 may include one or more container units 401 configured to hold the containers and/or covers for the containers. The container units 401 may be any shape or size to hold the necessary container. The container units 401 may be attached to the container modules 400 in any suitable manner. For example, the container units 401 may be slidingly engaged with the container modules 400 to allow the container units 401 to be stocked. The container units 401 may be stocked from either the front or rear of the container module 400. The container modules 400 and container units 401 may be made of any suitable material. In at least one embodiment, the container modules 400 are made of steel and the container units 401 are made of aluminum.

In at least one embodiment, the containers, such as a cup or bowl, may store some or all of the necessary ingredients within container. For example, a bowl may include a dry ingredient, such as oatmeal mix, and liquid such as water, milk, or other flavorings and ingredients may be added to the bowl from the merchandise dispensing system 10. In one or more embodiments, the containers, such as cups and bowls, may be compressed or reduced in size during transit and storage and may be expanded prior to use. In at least one embodiment, the user manually expands the container. Alternatively, the merchandise dispensing system 10 may be configured to expand the container prior to use. In at least one embodiment, the lids for the containers include an element that opens and closes or "pops up" to allow a user to access the inside of the container without removing the lid.

Figure 8:
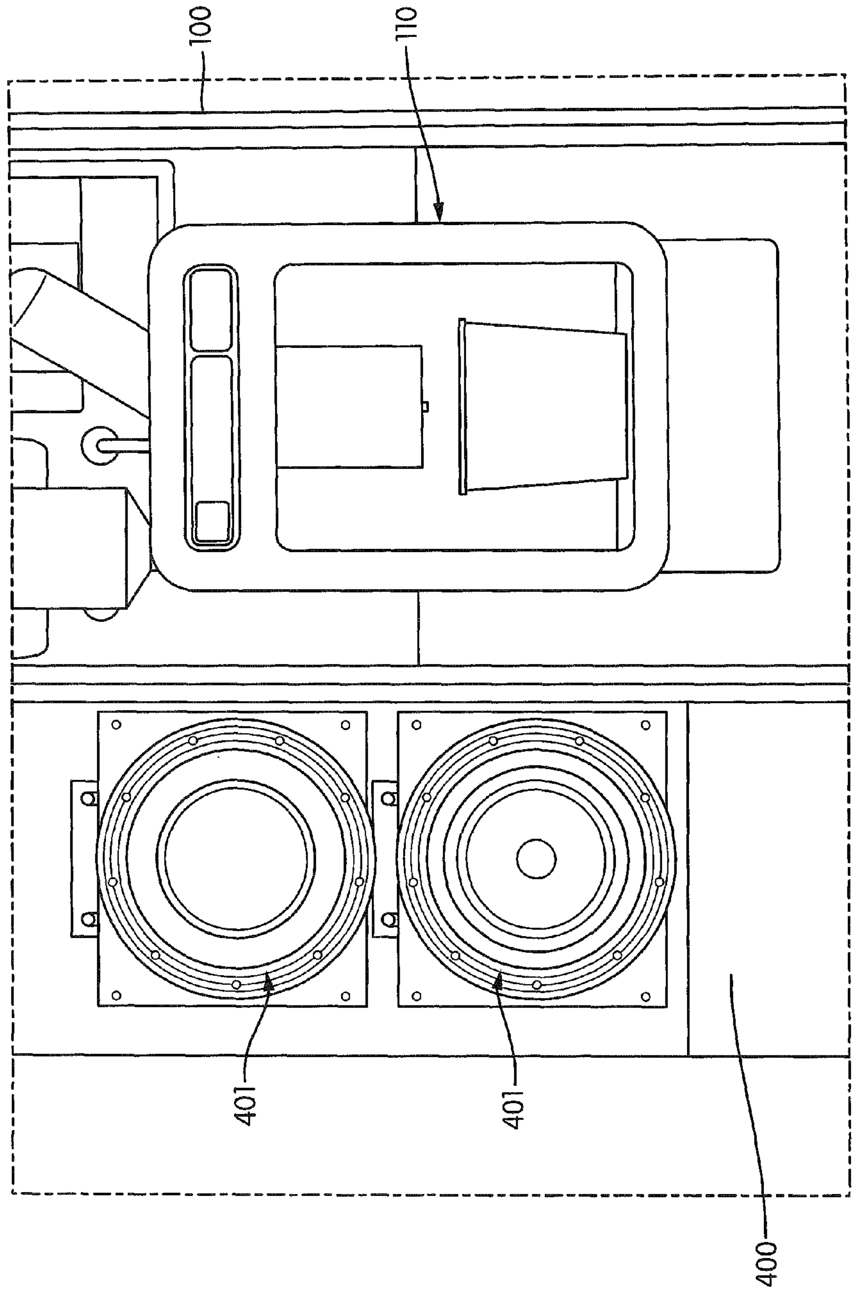
FIG. 8 illustrates a front view of a food module and a container module in accordance with aspects of the invention.

The container module 400 may be included within one or more of the food module 100, consumables module, 200 or the beverage module 300. In at least one embodiment, the food module 100 and the beverage module 300 includes a container module 400. The container module 400 may be separate from the other modules and positioned adjacent to one or more of the food module 100, consumables module, 200 or the beverage module 300. Alternatively, the container module 400 may be part of or unitary construction with one or more of the food module 100, consumables module, 200 or the beverage module 300. For example, as illustrated in FIG. 8, a container module 400 is placed adjacent a food storage unit 180 within a food module 100.

In at least one embodiment, the apertures 132, 133 located in the outer panel 130 of the food module 100 and the apertures 332, 333 located in the outer panel 330 of the beverage module 300 correspond with the container units 401. In this embodiment, the outer panel 130 of the food module 100 is a sufficient width to extend across the food storage unit 180 and the container module 400. Further, the outer panel 330 of the beverage module 300 is a sufficient width to extend across the beverage storage unit 180 and the container module 400.

Figure 9:
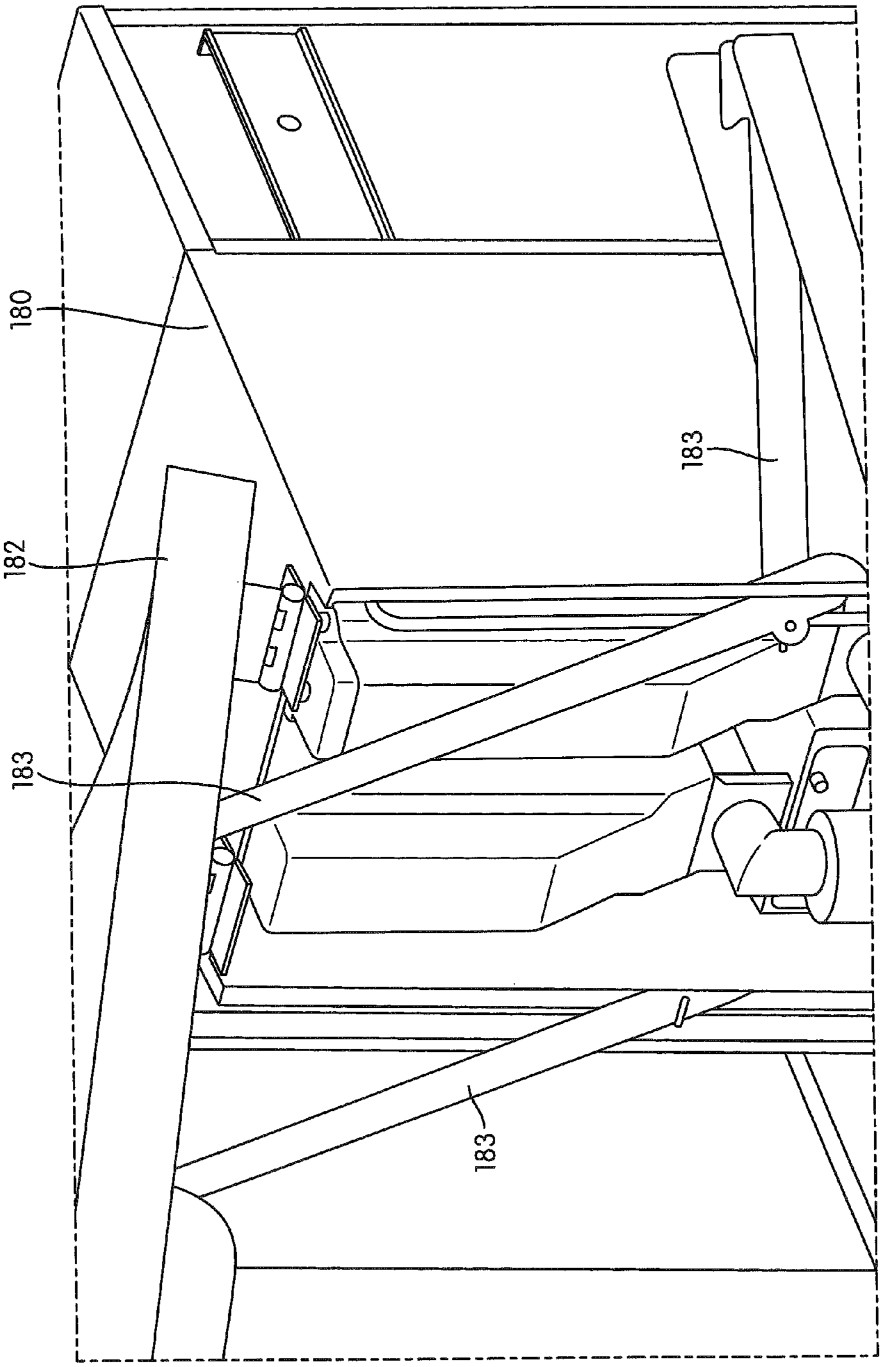
FIG. 9 illustrates a side perspective view of a food module in accordance with aspects of the invention.

In at least one embodiment, as illustrated in FIG. 9, the food storage unit 180 includes a door 182. The door 182 may cover the entire front portion of the food storage unit 180 or may cover only a portion of the front portion of the food storage unit 180. The door may open and shut in any suitable manner. In at least one embodiment, the door 182 pivots from a closed position to an open position. One or more struts 183 may keep the door 182 in an open position. In at least one embodiment, the door pivots upwardly and extends at a 110 degree angle from the front portion of the food storage unit 180 when the door 182 is in an open position.

Figure 10:
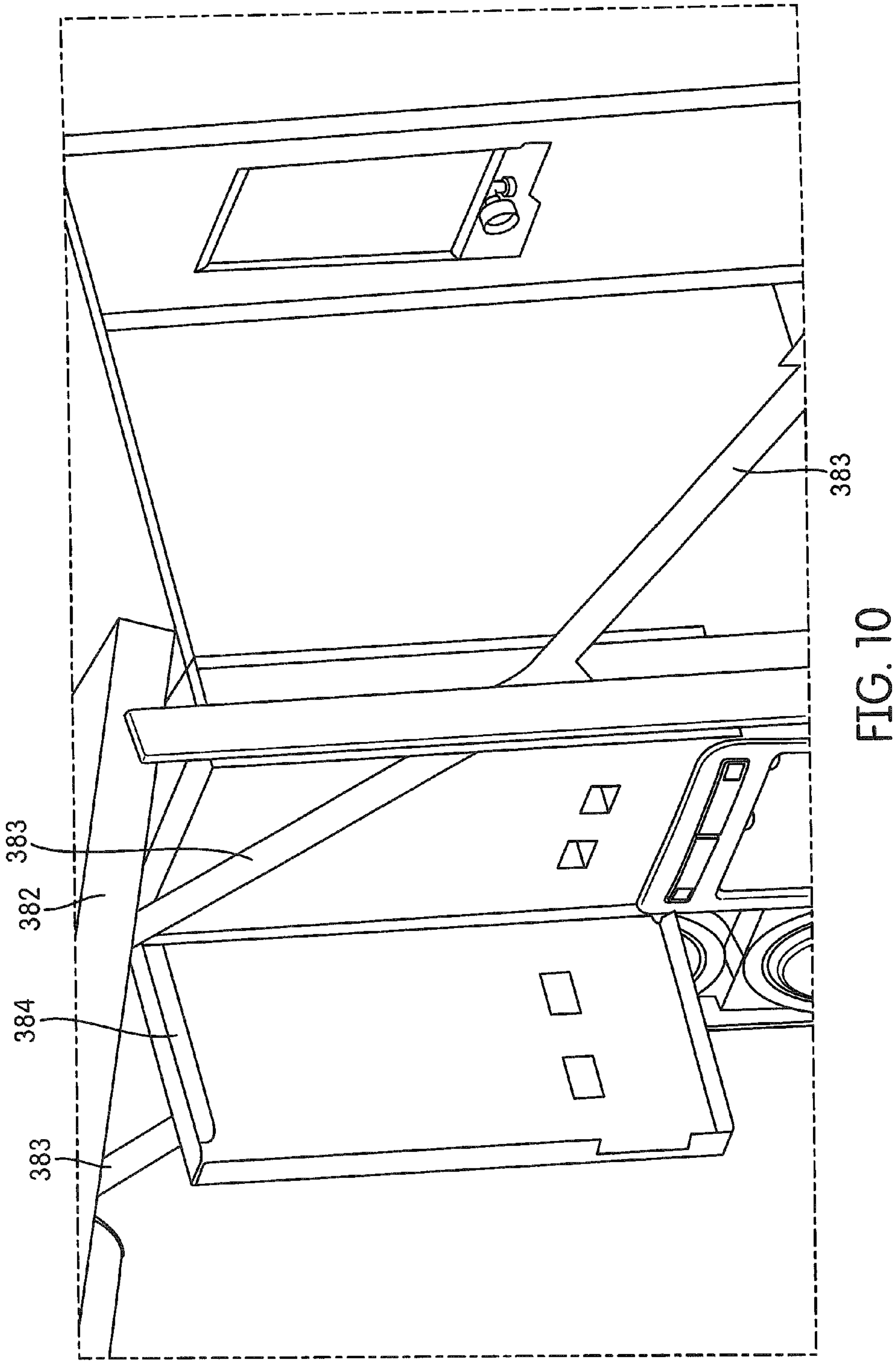
FIG. 10 illustrates a side perspective view of a beverage module in accordance with aspects of the invention.

In at least one embodiment, as illustrated in FIG. 10, the beverage storage unit 380 includes a plurality of doors 382, 384. In at least one embodiment, the beverage storage unit 380 includes an inner door 384. The inner door 184 may cover a portion of or the entire front of the beverage storage unit 380. In at least one embodiment, the inner door 384 covers a portion of the beverage storage unit 380, such as a refrigeration portion. The inner door 384 may open and shut in any suitable manner. For example, the inner door 384 may pivot on one side during movement. The outer door 382 may cover a portion of or the entire front of the beverage storage unit 380. In at least one embodiment, the door 382 pivots from a closed position to an open position. One or more struts 383 may keep the door 382 in an open position. In at least one embodiment, the door pivots upwardly and extends at a 110 degree angle from the front portion of the beverage storage unit 380 when the door 382 is in an open position.

In at least one embodiment, the configuration or layout of the merchandise dispensing system 10 suggests the steps and/or order of the steps for obtaining the food and beverage product to the consumer. For example, the merchandise dispensing system 10 may include a food module 100 on the left, a consumables module 200 in the center, and a beverage module 300 on the right. The merchandise dispensing system 10 may also include a container module 400 to the left of the food module 100 and a container module 400 between the beverage module 300 and the consumables module 200. This layout may suggest the following steps to the user: 1) take a container from the container module 400 next to the food module 100; 2) fill the container with food from the food module 300; 3) select any desired consumables from the consumables module 200 to add to the dispensed food; 4) take a container from the container module 400 next to the beverage module 300; and 5) fill the container with a beverage from the beverage module 300.

In at least one embodiment, the merchandise dispensing system 10 includes a messaging system that may display messages to a user. The messages may be displayed at any suitable location on the merchandise dispensing system 10. For example, the messages may be displayed on one or more of the panels 120, 150, 210, 320, 350 on modules 100, 200, or 300. The messages displayed may be based on any number of events or factors. For example, the messages may be based on the time of day, the product being dispensed, or may be based on the proximity of a user to the merchandise dispensing system 10. The messages may also be based on the weight, volume, or temperature of the product dispensed. The messages may also be based on the time of day, the time elapsed during a transaction, or the time a user is at the merchandise dispensing system 10. The messages may be based on the size or weight of a cup, bowl, or container for holding the food or beverage products. The messages may also be based on whether a container is present. Additionally, the messages may be based on an intelligent understanding of the dispenser and whether product has been dispensed.

In at least one embodiment, the merchandise dispensing system 10 includes a wireless network access point that allows electronic devices to wirelessly connect with the merchandise dispensing system 10. For example, a user may connect with the merchandise dispensing system 10 through a personal computer or a smart phone. In at least one embodiment, a user may use an application on a smart phone to connect to the merchandise dispensing system 10. The application may store the user's preferences or may give the user information about the products being dispensed on the merchandise dispensing system 10. In at least one embodiment, the wireless connection allows a user to complete all of the functions of the merchandise dispensing system 10 remotely.

In at least one embodiment, the merchandising system 10 includes social media capabilities. The merchandise dispensing system 10 may include a social media computer and an interface. The social media computer may be configured to be operatively connected to the interface and receive from the interface instructions for a beverage or food purchase order, a beverage or food gift, a beverage or food redemption, or a beverage or food promotion. The social media computer may be configured to generate a code based on the received instructions. The social media computer may be configured to be operatively connected to a communications network. In one aspect, the social media computer may be configured to transmit the code through the communications network to an interface of a device, which may be a mobile device. The mobile device may be remote from the merchandise dispensing system 10. The social media computer may be configured to transmit an electronic communication to the interface of the device. The electronic communication may be one or more of a text message, an audio message, and a video message. A user of a device may access an interface to gift beverages or food. A user of a device may access an interface using to receive information regarding a gift, as well as a message, and video playback of a recorded message from the giver of the gift.

In at least one embodiment, the merchandise dispensing system 10 is configured to provide beverages or food based on a gesture made at the merchandise dispensing system 10. The merchandise dispensing system 10 may be configured to have a gesture interface with a gesture interface reader or detector. A user may be able to gesture how much flavoring to add to a beverage or toppings to a food product, and the gesture interface may provide a screen display that corresponds to the user's gesture movement. The interface may also display an icon, such as a teaspoon, to depict the amount of an additive, such as a flavoring or a topping, to be included with, or reduced or eliminated from a beverage or food in accordance with the user's gesture(s) or other signals to the interface.

Variations and modifications of the foregoing are within the scope of the present invention. It should be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

What is claimed is:

1. A merchandise dispensing system for dispensing food and beverages comprising:

an arrangement of modules in the following order: a container module, a food module, a consumables module, and a beverage module, wherein the container module is adjacent to the food module, the food module is adjacent to the consumables module, and the consumables module is adjacent to the beverage module;

the food module including a plurality of food module frames, a plurality of food module panels, and a food module storage unit, the food module dispensing food stored in the food module storage unit, wherein the food module further includes a food dispensing unit that includes a nozzle for micro-dosing an additive or flavoring into the food;

the consumables module including a consumables module unit, one or more consumables module panels, a consumables module storage compartment and a consumables module frame, wherein the consumables module storage compartment stores and dispenses eating utensils;

the beverage module including a beverage module dispensing unit, a plurality of beverage module frames, a plurality of beverage module panels and a beverage module storage unit, the beverage module dispensing a beverage stored in the beverage module storage unit; and the container module including at least one container module unit that stores empty containers, the empty containers configured to be positioned by a user in at least one of the food module and the beverage module, wherein the container module is configured to permit the user to take a selected empty container, and wherein at least one of the food module and the beverage module is configured to permit the user to position the selected empty container in at least one of the food module and the beverage module.

2. The merchandise dispensing system of claim 1, further comprising a messaging system that displays messages to a user of the system.

3. The merchandise dispensing system of claim 2, wherein the messages displayed are configured to be based on factors including the time of day, the product being served, or the proximity of a user to the system.

4. The merchandise dispensing system of claim 1, further comprising a computer or server, and a user interface, wherein the computer is configured to be operatively connected to the interface and receive from the interface instructions for a beverage or food purchase order, a beverage or food gift, a beverage or food redemption, or a beverage or food promotion, and generate a code based on the received instructions.

5. The merchandise dispensing system of claim 1, wherein the food module, consumables module, beverage module and container module are all in close proximity to each other.

6. The merchandise dispensing system of claim 1, wherein the food module, consumables module, beverage module and container module are all fastened to each other.

7. The merchandise dispensing system of claim 1, wherein the food storage unit is configured to contain a dry food component and a liquid that is configured to be mixed with the dry food component.

8. The merchandise dispensing system of claim 1, wherein the merchandise dispensing system is configured to be connected to a user through a personal computer or a smart phone.

9. The merchandise dispensing system of claim 8, wherein the merchandise dispensing system is configured to be accessed by a user with an application on a smart phone to connect to the merchandise dispensing system.

10. The merchandise dispensing system of claim 1, wherein at least one panel of the food module panels, the beverage module panels and the consumables module panels has graphics or printed material thereon.

11. The merchandise dispensing system of claim 1, wherein the container module is configured to hold bowls, cups, and lids for the bowls or cups.

12. The merchandise dispensing system of claim 1, wherein the food module, consumables module, beverage module and container module are all movable in relation to each other.

13. The merchandise dispensing system of claim 12, wherein the food module, consumables module, beverage module and container module are configured to be positioned on a table top or counter.

14. The merchandise dispensing system of claim 1, further comprising a computer or server, and a user interface, wherein the computer is configured to transmit an electronic communication to the user interface, and wherein the electronic communication is one or more of a text message, an audio message, or a video message.

15. The merchandise dispensing system of claim 1, wherein the food module further includes a food dispensing unit that includes a nozzle for injecting air into the food.

16. The merchandise dispensing system of claim 1, wherein the beverage module further includes a beverage dispensing unit that includes a nozzle for injecting flavoring into the beverage.

17. The merchandise dispensing system of claim 1, further comprising a gesture interface comprising a gesture interface reader or detector, wherein the gesture interface is configured to allow a user to use a gesture movement to indicate how much flavoring to add to a beverage or how much toppings to add to a food product, and wherein the gesture interface is configured to provide a display that corresponds to the user's gesture movement.

18. The merchandise dispensing system of claim 3, wherein the messages displayed are configured to be based on factors including the time of day or the proximity of a user to the system.

19. A merchandise dispensing system for dispensing food and beverages comprising:

an arrangement of modules in the following order: a container module, a food module, a consumables module, and a beverage module, wherein the container module is adjacent to the food module, the food module is adjacent to the consumables module, and the consumables module is adjacent to the beverage module;

the food module including a plurality of food module frames, a plurality of food module panels, and a food module storage unit, the food module dispensing food stored in the food module storage unit;

the consumables module including a consumables module unit, one or more consumables module panels, a consumables module storage compartment and a consumables module frame, wherein the consumables module storage compartment stores and dispenses eating utensils;

the beverage module including a beverage module dispensing unit, a plurality of beverage module frames, a plurality of beverage module panels and a beverage module storage unit, the beverage module dispensing a beverage stored in the beverage module storage unit, wherein the beverage module further includes a beverage dispensing unit that includes a nozzle for injecting flavoring into the beverage; and the container module including at least one container module unit that stores empty containers, the empty containers configured to be positioned by a user in at least one of the food module and the beverage module, wherein the container module is configured to permit the user to take a selected empty container, and wherein at least one of the food module and the beverage module is configured to permit the user to position the selected empty container in at least one of the food module and the beverage module.

20. The merchandise dispensing system of claim 19, further comprising a messaging system that displays messages to a user of the system.

21. The merchandise dispensing system of claim 20, wherein the messages displayed are configured to be based on factors including the time of day, the product being served, or the proximity of a user to the system.

22. The merchandise dispensing system of claim 19, further comprising a computer or server, and a user interface, wherein the computer is configured to be operatively connected to the interface and receive from the interface instructions for a beverage or food purchase order, a beverage or food gift, a beverage or food redemption, or a beverage or food promotion, and generate a code based on the received instructions.

23. The merchandise dispensing system of claim 19, wherein the food module, consumables module, beverage module and container module are all in close proximity to each other.

24. The merchandise dispensing system of claim 19, wherein the food module, consumables module, beverage module and container module are all fastened to each other.

25. The merchandise dispensing system of claim 19, wherein the food storage unit is configured to contain a dry food component and a liquid that is configured to be mixed with the dry food component.

26. The merchandise dispensing system of claim 19, wherein the merchandise dispensing system is configured to be connected to a user through a personal computer or a smart phone.

27. The merchandise dispensing system of claim 26, wherein the merchandise dispensing system is configured to be accessed by a user with an application on a smart phone to connect to the merchandise dispensing system.

28. The merchandise dispensing system of claim 19, wherein at least one panel of the food module panels, the beverage module panels and the consumables module panels has graphics or printed material thereon.

29. The merchandise dispensing system of claim 19, wherein the container module is configured to hold bowls, cups, and lids for the bowls or cups.

30. The merchandise dispensing system of claim 19, wherein the food module, consumables module, beverage module and container module are all movable in relation to each other.

31. The merchandise dispensing system of claim 30, wherein the food module, consumables module, beverage module and container module are configured to be positioned on a table top or counter.

32. The merchandise dispensing system of claim 19, further comprising a computer or server, and a user interface, wherein the computer is configured to transmit an electronic communication to the user interface, and wherein the electronic communication is one or more of a text message, an audio message, or a video message.

33. The merchandise dispensing system of claim 19, wherein the food module further includes a food dispensing unit that includes a nozzle for injecting air into the food.

34. The merchandise dispensing system of claim 19, further comprising a gesture interface comprising a gesture interface reader or detector, wherein the gesture interface is configured to allow a user to use a gesture movement to indicate how much flavoring to add to a beverage or how much toppings to add to a food product, and wherein the gesture interface is configured to provide a display that corresponds to the user's gesture movement.

35. The merchandise dispensing system of claim 21, wherein the messages displayed are configured to be based on factors including the time of day or the proximity of a user to the system.

* * * * *